United States Patent
Ihlar et al.

(10) Patent No.: US 12,149,423 B2
(45) Date of Patent: Nov. 19, 2024

(54) METHODS AND ARRANGEMENTS FOR SUPPORTING ESTIMATION OF LATENCY OVER A COMMUNICATION PATH IN A COMMUNICATION NETWORK

(71) Applicant: Telefonaktiebolaget LM Ericsson (publ), Stockholm (SE)

(72) Inventors: Marcus Ihlar, Älvsjö (SE); Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/926,802

(22) PCT Filed: May 29, 2020

(86) PCT No.: PCT/SE2020/050545
§ 371 (c)(1),
(2) Date: Nov. 21, 2022

(87) PCT Pub. No.: WO2021/242154
PCT Pub. Date: Dec. 2, 2021

(65) Prior Publication Data
US 2023/0208735 A1    Jun. 29, 2023

(51) Int. Cl.
*H04L 12/26*    (2006.01)
*H04L 43/0864*    (2022.01)
(Continued)

(52) U.S. Cl.
CPC .......... *H04L 43/0864* (2013.01); *H04L 43/12* (2013.01); *H04L 43/50* (2013.01)

(58) Field of Classification Search
CPC ..... H04L 43/0864; H04L 43/12; H04L 43/50; H04L 47/22; H04L 43/0852; H04L 67/02; H04L 69/164; H04L 43/10; H04L 43/0829

See application file for complete search history.

(56) References Cited

U.S. PATENT DOCUMENTS

| 9,503,384 B1 | 11/2016 | Oliveira et al. |
| 2006/0039284 A1* | 2/2006 | Zhai ...................... H04L 49/901 370/235 |

(Continued)

FOREIGN PATENT DOCUMENTS

| EP | 2856703 A2 | 4/2015 |
| EP | 3437257 A1 | 2/2019 |

(Continued)

OTHER PUBLICATIONS

International Search Report and Written Opinion of the International Searching Authority, PCT/SE2020/050545, mailed Apr. 7, 2021, 11 pages.

(Continued)

*Primary Examiner* — Schquita D Goodwin
(74) *Attorney, Agent, or Firm* — Sage Patent Group

(57) ABSTRACT

Method and device(s) for supporting estimation of latency over a communication path in a communication network between a data flow shaping node and a probe node. The communication path comprising a data flow target node configured to receive a data flow from a data flow source node via the communication path. The data flow shaping node being configured to provide the data flow in bursts towards the data flow target node. The device(s) initiate to identify a suitable burst interval being a burst interval for which the probe node receives no potential acknowledgement packets during a predefined quiescent period, associated with the suitable burst interval, that covers an end portion of the suitable burst interval and/or a begin portion of a subsequent burst interval.

12 Claims, 6 Drawing Sheets

(51) Int. Cl.
*H04L 43/12* (2022.01)
*H04L 43/50* (2022.01)

(56) References Cited

U.S. PATENT DOCUMENTS

| | | | |
|---|---|---|---|
| 2015/0077181 A1* | 3/2015 | Talwalkar | H03F 3/217 |
| | | | 330/251 |
| 2016/0337222 A1 | 11/2016 | Stokking et al. | |
| 2016/0337223 A1 | 11/2016 | Mackay | |
| 2017/0187598 A1 | 6/2017 | Andreyev et al. | |
| 2018/0062972 A1* | 3/2018 | Rangappagowda | |
| | | | H04L 43/0876 |
| 2018/0176241 A1* | 6/2018 | Manadhata | G06F 16/2477 |
| 2019/0014054 A1* | 1/2019 | Cagle | H04W 28/06 |
| 2019/0021065 A1 | 1/2019 | Zahemszky et al. | |
| 2019/0116535 A1* | 4/2019 | Szilagyi | H04W 28/24 |
| 2019/0280917 A1* | 9/2019 | Hughes | H04L 43/0811 |
| 2019/0320479 A1* | 10/2019 | Choudhary | H04L 45/24 |
| 2020/0084156 A1 | 3/2020 | Gochi et al. | |
| 2020/0092213 A1* | 3/2020 | Tsilimantos | H04L 47/2483 |
| 2020/0120458 A1* | 4/2020 | Aldana | H04W 4/08 |
| 2020/0296023 A1* | 9/2020 | Kumar | H04L 43/12 |
| 2020/0313991 A1* | 10/2020 | Li | H04L 43/067 |
| 2020/0313999 A1* | 10/2020 | Lee | H04L 43/0847 |

FOREIGN PATENT DOCUMENTS

| | | | | |
|---|---|---|---|---|
| EP | 3437257 B1 * | 11/2020 | | H04L 43/0829 |
| EP | 3905708 A1 * | 11/2021 | | H04N 21/637 |
| ES | 2663852 T3 * | 4/2018 | | G01S 13/767 |
| WO | WO-2017077174 A1 * | 5/2017 | | H04B 17/0085 |
| WO | WO-2020063896 A1 * | 4/2020 | | |

OTHER PUBLICATIONS

Supplementary European Search Report, EP Application No. 20937562, mailed Jun. 16, 2023, 2 pages.
Indian Office Action, Indian Application No. 202217067261, mailed Mar. 18, 2024, 6 pages.

* cited by examiner

METHODS AND ARRANGEMENTS FOR SUPPORTING ESTIMATION OF LATENCY OVER A COMMUNICATION PATH IN A COMMUNICATION NETWORK

CROSS REFERENCE TO RELATED APPLICATIONS

This application is a 35 U.S.C. § 371 national stage application of PCT International Application No. PCT/SE2020/050545 filed on May 29, 2020, the disclosure and content of which is incorporated by reference herein in its entirety.

TECHNICAL FIELD

Embodiments herein concern a method and arrangements relating to estimation of latency, such as based on Round Trip time (RTT), over a communication path in a communication network, e.g. a wireless communication network, such as a telecommunications network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

QUIC is a User Datagram Protocol (UDP) based stream-multiplexed and secure transport protocol with integrity protected header and encrypted payload. Unlike the traditional transport protocol stack using Transmission Control Protocol (TCP), which resides in the operating system kernel, QUIC can easily be implemented in the application layer. This brings lots of flexibility in terms of evolution, congestion control and implementation of new features. QUIC is work in progress at the Internet Engineering Task Force (IETF) organization, see e.g. "QUIC: A UDP-Based Multiplexed and Secure Transport", version 27 (draft-ietf-quic-transport-27) and "Using TLS to Secure QUIC", version 27 (draft-ietf-quic-tls-27).

QUIC is a likely candidate to become the main transport protocol in the User Plane in wireless communication networks and also other communication networks. It is expected that most web applications, which today run mainly over HTTP/HTTPS, will migrate to QUIC.

An important distinction between QUIC and TCP is that QUIC is an encrypted protocol. Protocols that run on top of TCP are commonly protected by the Transport Layer Security (TLS) protocol that provides protection of the payload but not of the TCP headers. QUIC on the other hand, provides protection of both payload and packet headers. A QUIC packet is protected using two separate keys, one for protecting the packet header and another for protecting the packet payload. Furthermore, a QUIC packet header consists of less fields than the TCP counterpart. Instead, QUIC makes use of frames that are part of the protected packet payload for transport related information such as acknowledgements.

QUIC allows for migration of a connection between different Internet Protocol (IP) addresses and ports. Such migration can happen implicitly e.g. due to rebinding of Network Address Translation (NAT) state or explicitly, e.g. because the client decides to use a separate access network as it becomes available.

Latency measurement is commonly performed by network nodes to understand properties of end-to-end flows that traverse the network as well as the behavior of the network segments the flows are traversing. The most common form of latency that is measured on end-to-end flows is, or is based on, packet Round-Trip-Time (RTT). RTT is usually defined as the time from transmitting a packet until receiving an acknowledgement of said packet.

As QUIC is an encrypted protocol, it is not possible for a passive observer, who is not an explicit part of a QUIC conversation, to see which acknowledgement refers to what packet. Therefore, it is not possible to measure RTT for QUIC in the same way as is being done for TCP.

The QUIC protocol defines a mechanism known as the spin bit, which is designed to allow on-path passive observers to measure RTT by observing the periods of changes of the spin bit values. However, this explicit signal is an optional part of the QUIC protocol and it cannot be assumed to always be present.

In wireless communication networks, latency measurements and RTT are important measures as well, and e.g. used to find out about current conditions in the network and thereby for example get indication if there is congestion or other problems, or potential such problems ahead, typically in the RAN, or parts thereof. The wireless communication network may be configured to take various actions based on latency measurements and RTT. For example, current congestion detection techniques use RTT as a primary source of information for determining the level of load in the RAN. Current congestion detection techniques will therefore not work when the observed traffic is not TCP-based or QUIC-based with enabled spin bit.

When data and data flows, e.g. containing streaming video, are provided by means of QUIC packets, it can thus be problems to estimate latency.

SUMMARY

In view of the above, an object is to provide one or more improvements in relation to the prior art, in particular to provide improvements regarding estimation of latency over a communication path in a communication network, and that would work also when data packets are QUIC packets.

According to a first aspect of embodiments herein, the object is achieved by a method, performed by one or more devices, for supporting estimation of latency over a communication path in a communication network between a data flow shaping node and a probe node. The communication path comprising a data flow target node configured to receive a data flow from a data flow source node via the communication path. The data flow shaping node being configured to provide the data flow in bursts towards the data flow target node. Each burst being transmitted during a respective burst interval having a transmission period with data transmission and a subsequent silence period without data transmission. The device(s) initiate to identify a suitable burst interval being a burst interval for which the probe node receives no potential acknowledgement packets during a predefined quiescent period, associated with the suitable burst interval, that covers an end portion of the suitable burst interval and/or a begin portion of a subsequent burst interval. Said potential acknowledgement packets being acknowledgement packets that could have been transmitted by the data flow target node to acknowledge receipt of data packets of the data flow.

According to a second aspect of embodiments herein, the object is achieved by one or more devices for supporting estimation of latency over a communication path in a communication network between a data flow shaping node and a probe node. The communication path comprising a data flow target node configured to receive a data flow from a data flow source node via the communication path. The data flow shaping node being configured to provide the data flow in bursts towards the data flow target node. Each burst being transmitted during a respective burst interval having a transmission period with data transmission and a subsequent silence period without data transmission. The device(s) is configured to initiate to identify a suitable burst interval being a burst interval for which the probe node receives no potential acknowledgement packets during a predefined quiescent period, associated with the suitable burst interval, that covers an end portion of the suitable burst interval and/or a begin portion of a subsequent burst interval. Said potential acknowledgement packets being acknowledgement packets that could have been transmitted by the data flow target node to acknowledge receipt of data packets of the data flow.

The device(s) may then, or may be configured to, initiate to determine an estimate of the latency based on when the data flow shaping node transmitted one or more data packets during the identified suitable burst interval and when the probe node received one more potential acknowledgement packets regarding said one or more data packets.

When it has been identified that a burst interval is suitable, the probe node has thus received no potential acknowledgement packets during a time period corresponding to the quiescent period. In other words, the risk of mixing acknowledgement packets between burst can be avoided. Hence it is likely, or even be certain in some situations, that the potential acknowledgement packets received by the probe node were sent to acknowledge, i.e. in response to, the data packets of the burst of the suitable burst interval. The latency over the communication path corresponds to RTT when the probe node is the data shaping node.

Hence, embodiments herein support estimation of latency that work also when data packets are QUIC packets without spin bit.

BRIEF DESCRIPTION OF THE DRAWINGS

Examples of embodiments herein are described in more detail with reference to the appended schematic drawings, which are briefly described in the following.

DETAILED DESCRIPTION

Figure 1:
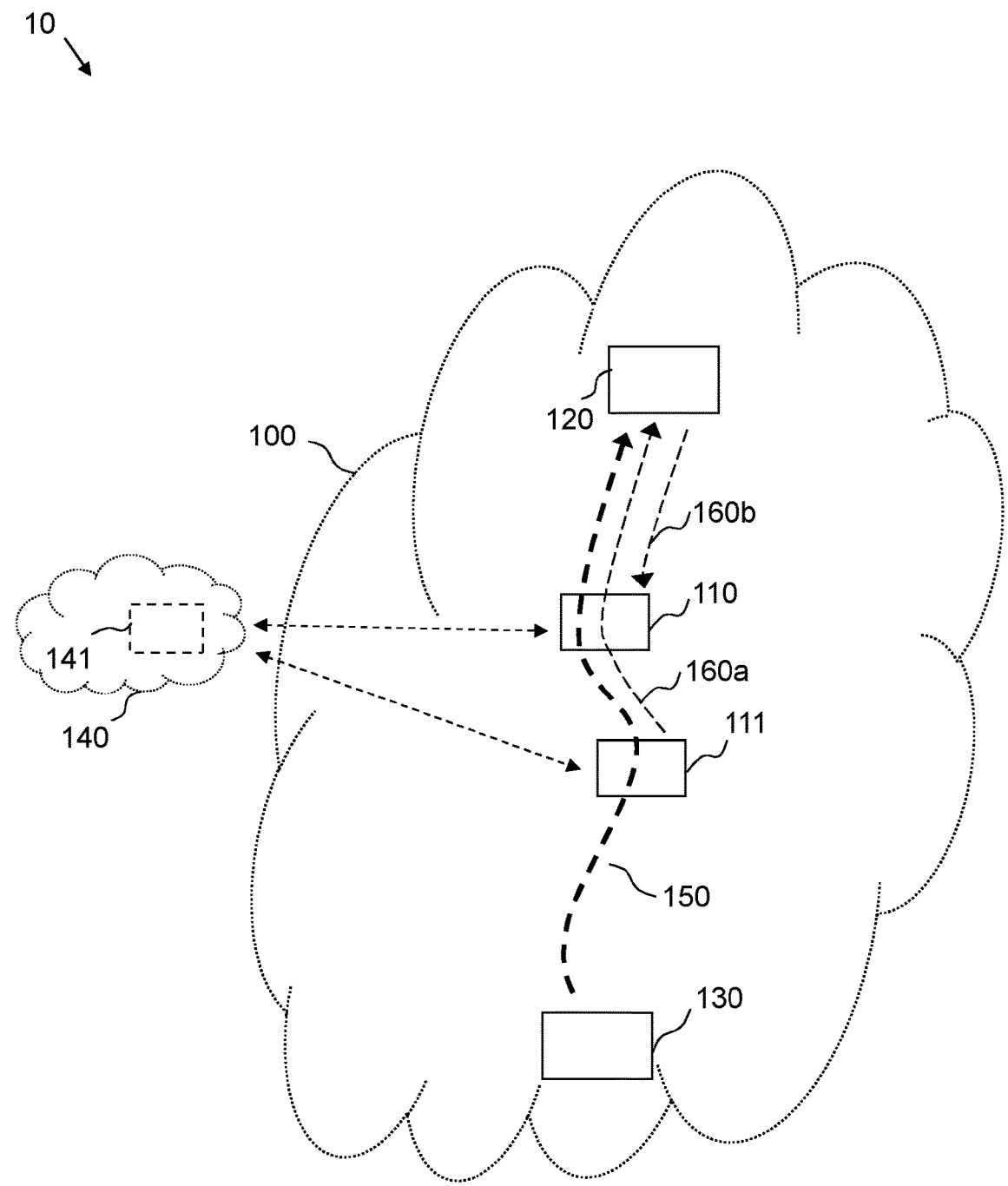
FIG. 1 is a block diagram schematically depicting an example of a first communication system to be used for discussing embodiments herein.

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, some ideas underlying embodiments herein will first be discussed.

To deliver traffic, i.e. data, from hosts, e.g. servers, to clients, e.g. wireless communication devices, data shaping is often applied. It is e.g. common practice in cellular networks to perform throttling of Adaptive BitRate (ABR) video flows. A node in communication network, e.g. CN, or in a Local Area Network (LAN), detects flows that deliver video of ABR characteristic and shapes the set of flows to a configured bitrate. Shaping of ABR video flows has the potential of causing a reduction of volume consumed by the video service carried by the flows. An ABR client may continuously estimate the downlink bandwidth and selects a video resolution that best matches the available bandwidth.

For a wireless communication network, the volume reduction that can be achieved by shaping video is most useful when the RAN is under high load. Therefore, it is common for network nodes that perform shaping to be also be associated with a load or congestion detection mechanism. Such a mechanism usually uses RTT-based latency estimates as primary source of information to determine the load level in RAN.

When shaping traffic, e.g. in wireless communication networks, e.g. cellular and/or telecommunication networks, it has turned out to be beneficial to transmit data in large bursts consisting of several MTU sized packets at a time, i.e. transmitting the data at transmission periods with silence periods in between. A benefit of sending data in bursts is that it mitigates some negative impacts on RAN throughput metrics that are commonly observed when transmitting shaped data packet by packet or in small bursts. Furthermore, there are shaping techniques that mitigate the impact of large flows of data on loaded RANs by transmitting the data in bursts. The burst are typically formed by a downstream node or device, i.e. the data stream is transformed into the bursts, e.g. a node or device in the CN or RAN may correspond to data flow shaper or data flow shaping node and may be configured to convert a received data flow into burst for further delivery to the client, such as a wireless device.

Embodiments herein may in a simplified way be described as utilizing the presence of and/or the ability to form bursts, e.g. when there is a data shaping node in a communication network configured to shape data flows into bursts, to find out latency in a network part where the bursts are delivered, e.g. the RAN, and do this in a manner that works also in the case of QUIC packets.

FIG. 1 is a block diagram schematically depicting an example of a first communication system 10 to be used for discussing embodiments herein and in which embodiments herein may be implemented. The first communication system 10 comprises a communication network 100 that may be or be based on an IP network, or in other words, a data communication network based on, such as implemented to support, the Internet Protocol, e.g. version 4 or version 6, i.e. IPv4 or IPv6. The figure shows a client device 120 in the communication network 100, e.g. served by it and/or enabled to receive and/or transmit data traffic in and/or via the communication network 100. The figure further shows a server device 130, e.g. a host device, that for example provides data for communication to/from the client device 120, such as media for streaming, e.g. audio and/or video data, via the communication network 100. The figure further schematically illustrates a data flow 150 from the server device 130, in and via the communication network 100, to the client device 120. The data flow 150 may comprise said data provided by the server device 130. The client device 120 is thus here an example of a data flow target node and the server device 130 is an example of a data flow source node.

Further, a communication path 160a-b is shown between a data flow shaping node 111 and a probe node 110. The probe node 110 may be a separate or same node as the data flow shaping node 111

In the figure it is also shown a remote device 141, e.g. remote network node, and a remote computer network 140 that the remote device 141 may be part of or connected to The remote computer network 140 may correspond to a so called computer cloud, or simply cloud, providing certain services. The remote device 141 and/or remote network 140 may e.g. be communicatively connected to the multi-access communication network 100 and e.g. the prober node 110 and/or the data flow shaping node 111, as illustrated in the figure.

Figure 2:
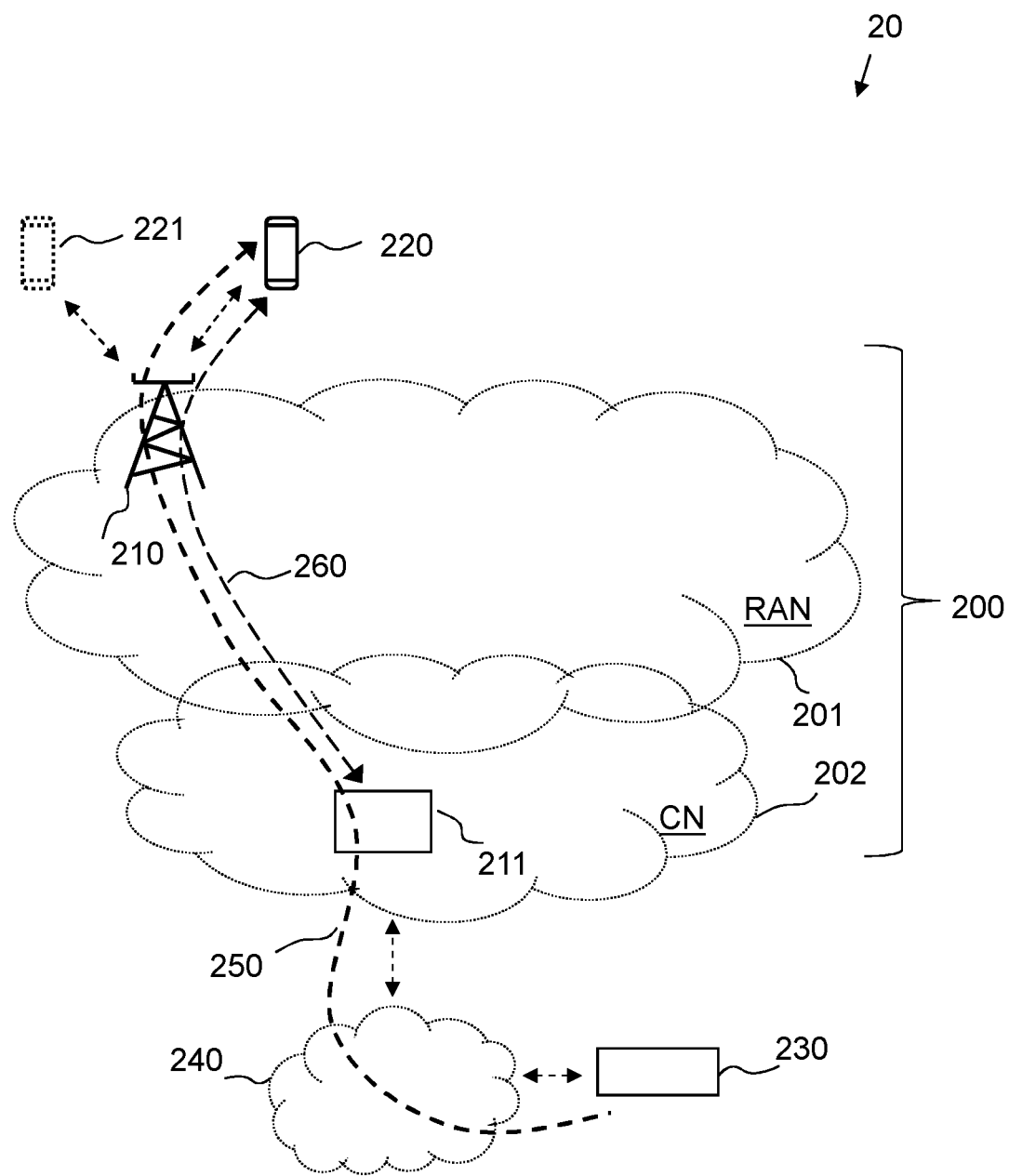
FIG. 2 is another block diagram schematically depicting an example of a second communication system to be used for discussing embodiments herein FIG. 3 schematically illustrates an example of how a data flow can be shaped and be transmitted in bursts.

FIG. 2 is a block diagram schematically depicting an example of a second communication system 20 to be used for discussing embodiments herein and in which embodiments herein may be implemented. The second communication system 20 comprises a wireless communication network 200, e.g. a telecommunication network. The wireless communication network 200 may comprise a Radio Access Network (RAN) 201 part and a core network (CN) 202 part. The wireless communication network 200 is typically a telecommunication network or system, such as a cellular communication network that supports at least one Radio Access Technology (RAT), e.g. LTE, or 4G, New Radio (NR) that also may be referred to as 5G.

The wireless communication network 200 comprises network nodes that are communicatively interconnected. The network nodes may be logical and/or physical and are located in one or more physical devices. The wireless communication network 200, typically the RAN 201, may comprise a radio network node 210, i.e. a network node being or comprising a radio transmitting network node, such as base station, and/or that are being or comprising a controlling node that controls one or more radio transmitting network nodes. Said radio network node may e.g. be communicatively connected, such as configured to communicate, over, or via, a so called X2-U communication interface or communication link with other radio network nodes (not shown) comprised in the RAN.

Further, the shown wireless communication network 200, e.g. the CN 202, comprise a network node 211, e.g. a core network node, such as a Packet GateWay (P-GW) in LTE/4G or User Plane Function (UPF) node in NR/5G, that may be communicatively connected, such as configured to communicate, over, or via, a communication interface or communication link, such as the so called so called S1-U, with radio network nodes of the RAN 201, e.g. with the radio network node 210. The network node 211 should correspond to a data shaping node, i.e. a node with ability, e.g. configured to, to transform a data flow it receives into bursts for further transmission.

S1-U, X2-U are IP/UDP based and are examples of user plane protocols used in e.g. LTE and NR wireless communication networks. These user plane protocols can be considered to correspond to application layer protocols in terms of a IP network in general.

Hence, the wireless communication network 200 can be considered to be based on and/or comprise one or more IP networks. For example, the radio network node 210 may be communicatively connected, e.g. via X2-U, to another radio network node in an IP network part of the RAN 201. Moreover, the network node 210 may be communicatively connected, e.g. via S1-U, to the network node 211. This connection is in an IP network of the wireless communication network 200 that connects the RAN 201 and CN 202.

The wireless communication network 200, or specifically one or more network nodes thereof, e.g. the radio network node 210, is typically configured to serve and/or control and/or manage one or more wireless communication devices, such as a first communication device 220 and a second communication device 221, in radio coverage areas, i.e. an area where radio coverage is provided for communication with one or more communication devices. The communication device 220 may alternatively be named a wireless communication device, or simply wireless device, and it may correspond to a User Equipment (UE). Each radio coverage may be provided by and/or associated with a particular Radio Access Technology (RAT). The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. There may be more than one beam provided by one and the same network node.

The wireless communication network, e.g. the CN 202 thereof, may further be communicatively connected to, e.g. via the core network node 212, and thereby e.g. provide access for said communication device 220, to an external network 240, e.g. the Internet. The external network 240 comprise and are connected to further network nodes, e.g. an external network node 230. External here refers to external vs. the wireless communication network 200. The external network node 230 may e.g. correspond to a server providing service(s) to one or more other internet connected devices, e.g. the first communication device 220 that may be provided with access to the external network 230, such as the Internet, via the wireless communication network 200, e.g. specifically via the core network node 220 as mentioned above. The first communication device 220 may thus be communicatively connected, e.g. by means of TCP/UDP/IP and an application layer protocol, via the wireless communication network 200 and the external network 240, with the external network node 230. A data flow 250, as indicated in the figure by a dotted line, may e.g. be provided from the external network node 230, via the external network 240 and the wireless communication network 200, to the first communication device 220. The external network node 230 may e.g. be a server providing a video streaming service accessed via an application, or app, executing on the first communication device 220. A similar situation could arise with another or the same communication device that is connected to the Internet via a Local Area Network (LAN), e.g. a WiFi network at home, instead of to the wireless communication network 200, e.g. 5G, as discussed above.

Further, a communication path 260 is shown from the network node 211 to the first client device and back again.

In comparison with FIG. 1, the first communication device 220 may be considered to correspond to the client device 120 and thus be example of a data flow target node, the wireless communication network 200, possibly together with the external network 240, may be considered to correspond to the communication network 100, and the network node 211 may be considered to correspond to the data flow shaping node 111 and the probe node 110. The external network node 230 may be consider to correspond to the server device 130, the data flow 250 to the data flow 150 and the communication path 260 to the communication path 160a-b, at least in the situation when the probe node 110 and the data flow shaping node 111 are the same node.

It may be noted that a server, e.g. a device or network node, corresponding to the server device 130 or the external network node 230 or external network 240, in practice may correspond to one or more physical nodes or devices, e.g. associated with a service through or from which the data flow, e.g. 150 or 250, is provided. The server may alternatively be termed e.g. a host computer, a server system or communication system.

Attention is drawn to that FIG. 1 and FIG. 2 are only schematic and for exemplifying purpose and that not everything shown in the figured may be required for all embodiments herein, as should be evident to the skilled person. Also, a communication network and wireless communication network that correspond(s) to the ones shown in the figures will typically comprise several further device, network nodes and details, as realized by the skilled person, but which are not shown herein for the sake of simplifying.

Figure 3:
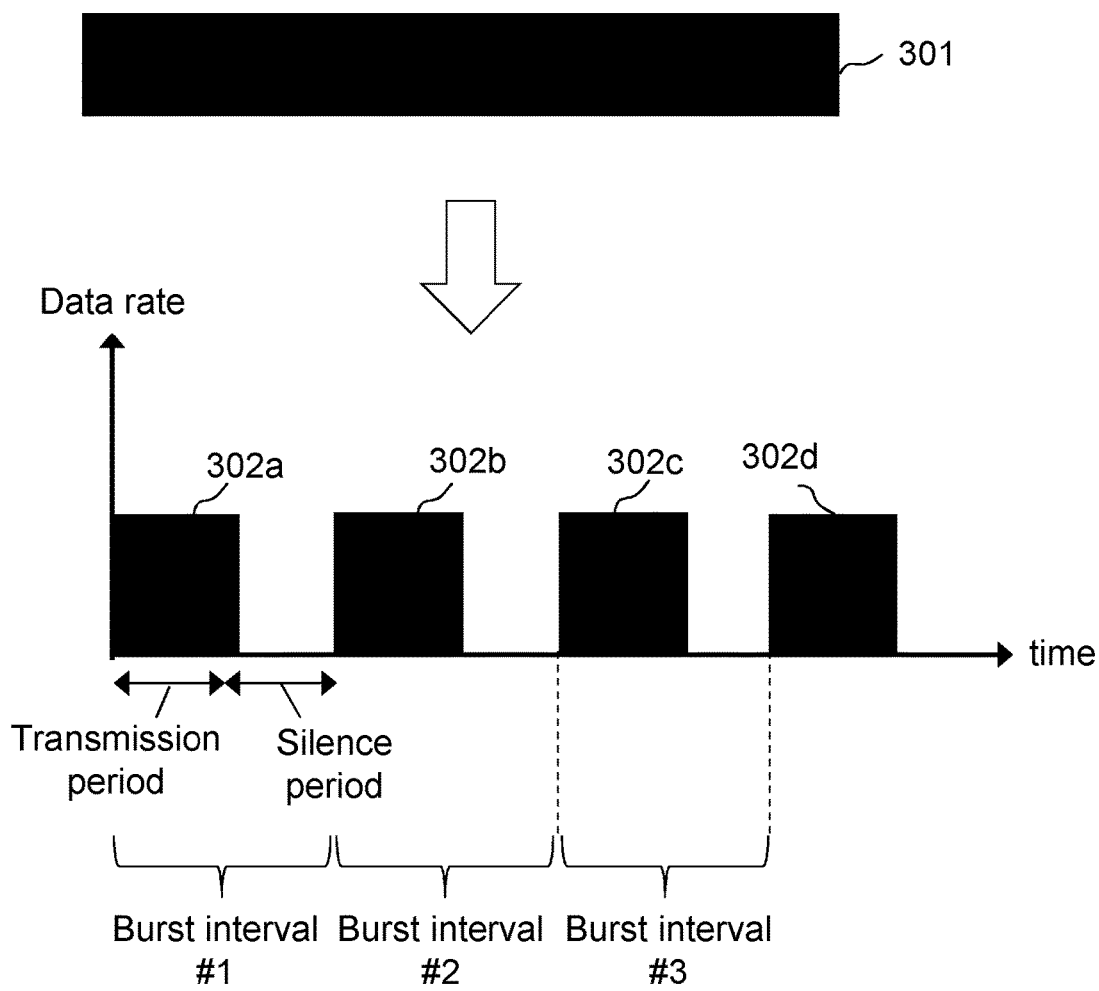

FIG. 3 schematically illustrates an example of how a data flow can be shaped and be transmitted in bursts, i.e. illustrates what already has been described above. What is shown is how data 301 of a dataflow, e.g. of any of the data flows 150, 250, can be transmitted in data bursts 302a-d. Note that data 301 in the figure is schematic and can be considered to show a data amount. In practice when data is received over time, the data will vary. The shaping of the data 301 into the bursts may e.g. be performed by the data shaping node 111 or the network node 211. As can be seen in the figure, the data in a burst is transmitted under a transmission period that is followed by silence period until data transmission of the next burst in time, i.e. of the subsequent burst, is taking part.

A burst interval, i.e. time between bursts, may be named a burst interval and thus corresponds to the transmission period and the silence period. For example, the burst interval of the shown first burst 302a is the burst interval #1 etc. In the shown figure, the burst intervals appear the same between bursts, as well as the transmission periods, the silence periods and the burst bit rates during transmission. However, in practice there may be variation and the node providing the burst is typically configurable such that the burst intervals and/or transmission periods and/or silence periods and/or bit rates may change and vary between bursts if desirable.

QUIC is a reliable protocol where packets are acknowledged similarly to TCP. However, as already indicated above, a problem with QUIC is that it cannot be tracked exactly which packet(s) an acknowledgment is referring to. There are conditions however, where it is possible to deduce the RTT of a QUIC flow, i.e. data flow where data packets are QUIC packets. If the path between the point of measurement, i.e. where acknowledgement packets are received, such as at the probe node 110 or network node 211, and the receiver of the QUIC packets, e.g. the client device 120 or the first communication device 220, is empty, it is possible to calculate the time from when a set of packets is transmitted downstream to the receiver until another set of packets are observed in the reverse direction, i.e. upstream, from the receiver, which then can be assumed to be acknowledgement packets. This provides information that can be used to estimate latency. Such conditions and situation arise "naturally" e.g. when a connection is being established during the exchange of initial handshake packets and when a connection has been application limited, meaning that the application has stopped sending data to the network for some time. However, this is perhaps the only natural occurring situation that can be utilized "as is" for this purpose, but it is of course of interest to be able to estimate latency also at other occasions. Such condition as described may occur naturally also at other occasions, but it is conventionally difficult or impossible to know when, thus making it difficult to take advantage of this.

Embodiments herein may generally be considered based on identifying a burst that has a suitable burst interval, e.g. when there is an occasion similar as described above and that can be utilized to estimate latency. The suitable burst interval may occur among bursts provided for whatever reason bursts are already being provided, or the bursts may be temporarily formed and/or controlled to increase probability or even to enforce that a suitable burst interval at least temporarily will occur, and then can be identified as a suitable burst interval to be exploited to estimate latency. The suitable burst interval may be described as one for which it has been identified that acknowledgement packets are not showing up too or so late that it can be mixed up from which burst the acknowledgement packets belong to. That is, the suitable burst interval is one where there is some indication that received acknowledgement packets regarding one and the same burst should be sufficiently separated in time from acknowledgement packets regarding some other burst. How such suitable burst interval can be identified and be utilized in embodiments herein, is descried below in connection with FIG. 5.

A traffic shaper, e.g. one already in use to shape a data flow, e.g. into burst, such as the data flow shaping node 111 or the network node 211 with shaping capability, may be used to create burst intervals that are suitable. Typically a data flow shaping node sends data in bursts of a fixed size with a fixed interval between burst transmissions, i.e. fixed data amount transmitted during transmission period and fixed silence periods, as shown in FIG. 3. If e.g. the RTT between the data flow shaping node, e.g. 111 or 211, is lower than the burst interval, and a "bottleneck" bandwidth is higher than the shaping bitrate, a complete set of acknowledgement packets will be seen by the data flow shaping node before the transmission of the next burst. If either of those conditions does not hold, there will be acknowledgments of packets from the previous burst arriving after the transmission of the next burst, thereby making it difficult or impossible to know to which burst the acknowledgements packets relate to. As used herein, a "bottleneck bandwidth" is a bandwidth, e.g. corresponding to a bitrate, that if it is being exceeded, there will be packet loss, e.g. due to congestion or some other limitation in the network downstream from the data flow shaping node.

It may e.g. be defined a threshold so that it can be determined whether acknowledgment packets observed after a burst can be used to calculate a reliable RTT. If there e.g. is a quiescence period that spans a time before and after the next burst transmission, during which no packets are observed, the burst interval used can be identified as suitable, and it may, after observing a set of packets that are acknowledgements, be deemed possible to estimate latency reliably, e.g. based on calculating RTT. RTT may be calculated by measuring the time from transmitting the burst until receiving the first packet determined to be an acknowledgement.

If packets are observed within the required quiescent period, it is deemed that no reliable RTT can be calculated for the current burst. If this is the case, in some embodiments, the burst interval of the next burst may be changed, e.g. by increasing, such as doubling, the burst interval and/or increasing the silence period, thus increasing the probability that a suitable burst interval will occur. Also the transmission period may be increased. If the data amount per burst is maintained, increasing the transmission period means lowering the bit rate during the transmission period, thus reducing the risk that the bit rate results in packet loss. To maintain the average bit rate during the burst interval, in some embodiments, the bitrate is maintained and the total data amount transmitted during the increased burst interval is increased, e.g. while doubling the transmission period and the silence period.

Figure 4:
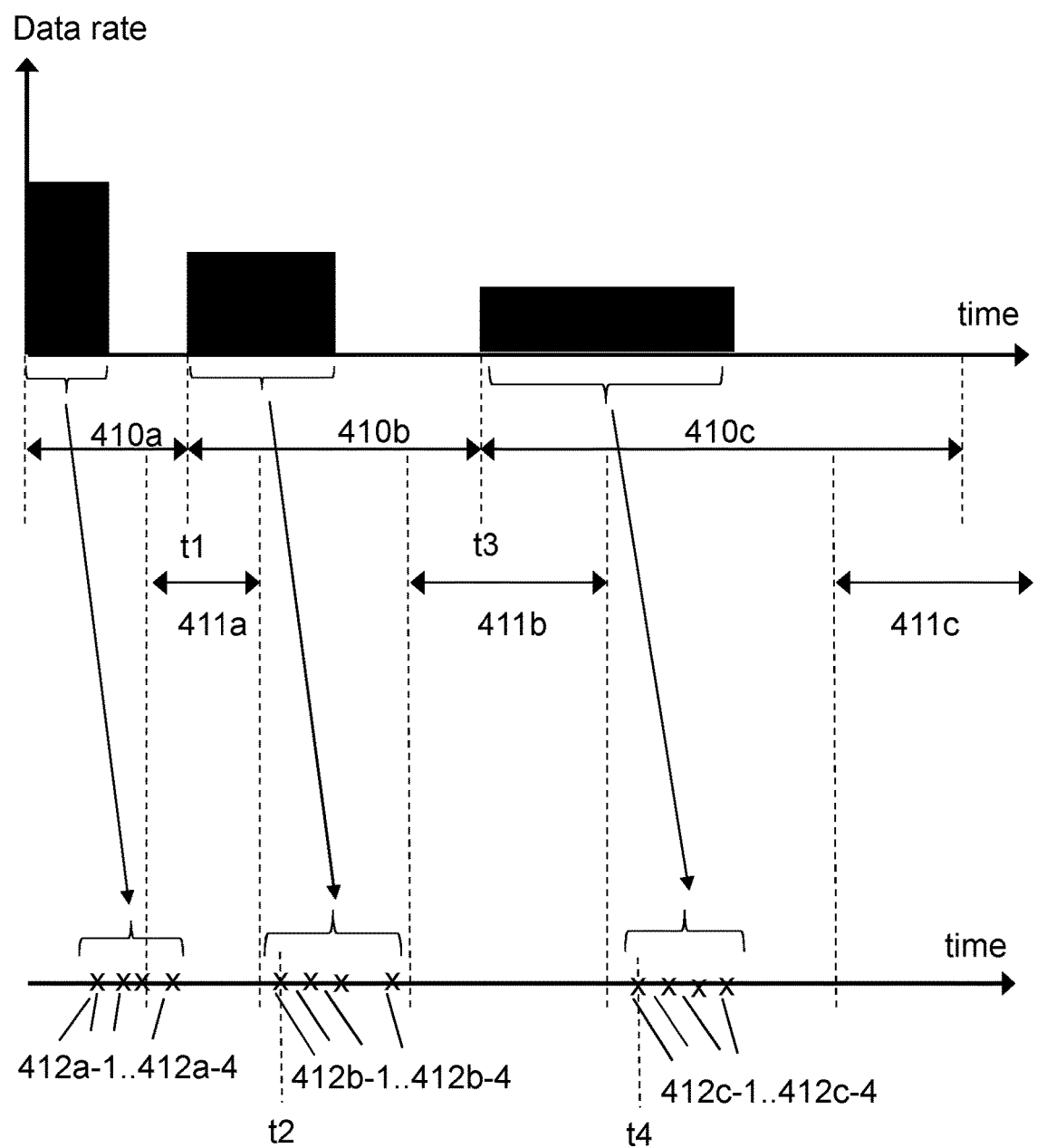
FIG. 4 schematically illustrates an example for explanation of how a data flow transmitted in burst can be utilized to estimate latency in accordance with embodiments herein.

FIG. 4 schematically illustrates an example for explanation of how a data flow transmitted in burst can be utilized to estimate latency in accordance with embodiments herein.

The upper part of the figure shows three consecutive burst being transmitted in burst intervals 410a-c, e.g. by the data shaping node 111 or the network node 211. The bursts are thus e.g. burst of the data flow 150 or 250. In the shown example, the burst intervals are increasing, with a doubling of the preceding burst interval by doubling of the transmission period and silence period. The amount of data in each burst is the same, whereby the bitrate is reduced when the burst interval increase. As mentioned, in some embodiments, the bit rate may be maintained and thus doubling the data amount if the transmission period doubles. Also note that a change of burst intervals is not needed in all embodiments, e.g. if a suitable burst interval occurs anyway. Also, in case of increase, it is of course not needed to increase by doubling. The increase may be predefined or predetermined, and may be for temporal use to enable estimation of latency according to embodiments herein, or the variation between the bursts may occur for some other reason.

In any case, there is a predefined quiescent period associated with each burst interval, e.g. a quiescent period 411a associated with the burst interval 410a and a quiescent period 411b associated with the burst interval 410b. Each quiescent period should cover an end portion of the burst interval it is associated with, i.e. at least part of the end of the silence period, and/or may cover a begin portion of a subsequent burst interval, e.g. is quiescent period 411a covering a begin portion of burst interval 410b.

The quiescent period should be defined in relation to the burst interval it is associated with and/or the burst interval(s) it overlaps with. For example, it may be defined as a fraction, e.g. percentage, of the burst interval(s) or the silence period(s), such as 20-50% of the burst interval(s) or 40-100% of the silence period. In the illustrative example shown in the figure, each quiescent period is about 25% of the burst interval it is associated with, corresponding to about 50% of the silence period, and about 25% of the subsequent burst period, corresponding to 50% of the transmission period of the subsequent burst interval. In any case, the upper part of the figure is mainly for explaining the principle of the quiescent periods, i.e. that such covers an end portion of a burst interval, i.e. in that case at least part of its silence period, and/or a begin portion of a subsequent burst interval, i.e. in that case at least part of its transmission period.

Moreover, the lower part of FIG. 4 shows receipt of acknowledgement packets 412a-1 . . . 412a-4 relating to the data packets of the burst in the burst interval 410a, acknowledgement packets 412b-1 . . . 412b-4 relating to the data packets of the burst in the burst interval 410b, and acknowledgement packets 412c-1 . . . 412c-4 relating to the data packets of the burst in the burst interval 410c. The receipt is in the probe node 110 or network node 211. In other words, the bursts shown in the upper part of FIG. 4 are transmitted by the node forming the bursts, e.g. the data flow shaping node 111 or the network node 211, towards the data flow target node, e.g. the client node 120 or the communication device 220. The data packets of the bursts thus travel downstream along the communication path 160a or 260. Receipt of the data packets of the bursts, e.g. QUIC packets, is acknowledged by said dataflow target node, and the acknowledgement packets sent in the opposite direction of the received data flow, thus traveling upstream in relation to the received data flow, towards the data flow source node, e.g. the server device 130 or the external network node 230, which typically is also towards the data flow shaping node that transmitted the bursts, e.g. the data flow shaping node 111 or the network node 211. Along the way, the acknowledgement packet will be passing, and thus be received by, one or more intermediate nodes, e.g. the probe node 110 or the network node 111, and will then thus have travelled along the communication path 160b, i.e. the rest of the communication path 160a-b, or the remaining part of the the communication path 260. The total communication path for the data packets of a burst and the acknowledgement packets can thus be known and if the time could be measured from when a burst packet was transmitted at the beginning of the communication path, until receipt of a corresponding acknowledgement packet at the end of the communication path, this may thus be used as a measure of latency regarding data traffic over the communication path. The measure would correspond to RTT if the receipt of the acknowledgement packets are received by, and the communication path ends in, the data shaping node, i.e. in the same node that transmitted the bursts.

Since the data shaping node typically is accessible and it can be obtained information from it when burst packets are transmitted, or this can even be controlled, it is sufficient with a node receiving the acknowledgement packets and be able to obtain information on their time of receipt, to enable latency estimation, if it would be possible to be sufficiently sure which burst the acknowledgement packages belong to. If the acknowledgement packets are or risk to be mixed with acknowledgment packets from other bursts, it may, as explained above, be impossible to measure latency with useful accuracy. However, if it can be made sure that there is a sufficient period without acknowledgement packets, it can be certain, or at least sufficiently certain, that the acknowledgement packets, if and when received, belong to a particular burst such as the burst closest preceding in time at receipt of the acknowledgement packets. This is what said quiescent periods are used for, as already explained above. By identifying that a burst interval is suitable, i.e. is a burst interval that resulted in that no acknowledgement packets were received within a predetermined quiescent period associated with that burst interval, it can be assumed that the acknowledgement packets belong to the burst transmitted closest in time before receipt of the acknowledgement packets. In the example shown in FIG. 4, it is shown that the acknowledgement packet 412a-4 is received within the quiescent period 411a, i.e. the quiescent period that belongs to the burst interval 410a, thus indicating that the burst in the burst interval 410a and its acknowledgement packets should not be used to estimate latency. However, in the quiescent period 411b belonging to the subsequent burst interval 410b, there is no acknowledgement packet, thus indicating that the acknowledgement packets received before the quiescent period 411b, thus in the time slot between the quiescent period 411a and 411b, belongs to the burst of the burst interval 410b and can be used to estimate latency.

The latency estimate may in turn e.g. be based on a time t1 when the first data packet of the burst in burst interval 410b was transmitted and a time t2 where the first acknowledgement packet 412b-1 was received. In some embodiments, explained further below, when an acknowledgement packet is only sent for every Nth received data packet, the latency estimate may instead be based on when the first Nth data packet of the burst was transmitted. In such case it should also be made sure that each burst consists of a number of data packets that is an integer multiple of N data packets. It could also be considered to base latency estimates on an average time for transmission of data packets generating acknowledgment packets in a burst and/or average time for receipt of the acknowledgement packets regarding these data packets.

In some embodiments, the risk for mixed acknowledgement packets from different bursts is further reduced by making sure that there are no acknowledgement packets received also in a preceding predefined quiescent period, i.e. associated with a directly preceding burst interval to the suitable burst interval. For example, with reference to FIG. 4, in this case it would e.g. be identified that there are no potential acknowledgement packets received in the quiescent period 411b and quiescent period 410c, to identify the burst interval 410c as suitable, whereby receipt of one or more of the acknowledgement packets 412c-1 may be used to determine an estimate of latency, for example, similar as above but using time t3 and time t4, instead of time t1 and time t2, to estimate latency. These embodiment may particularly be useful if embodiments herein are applied without or with limited possibility to control or adapt the burst intervals to facilitate forming of a suitable burst interval, e.g. if the burst intervals applied are affected by some factor that cannot be fully controlled and it therefore is not known exactly how the burst intervals will look like and/or when. It may in such situation be worth wait some time and hope that a burst interval will occur that is identified as suitable and allow latency to be estimated. Said two consecutive quiescent periods without receipt of potential acknowledgement packets may be a more stable and reliable indication that the burst interval located between them is suitable. Identifying a situation like this, i.e. with acknowledgement packets in a group separate in time with quiescent periods before and after, i.e. providing a distance both before and after to other potential acknowledgement packets, further increases the probability that the potential acknowledgement packets belong together and relate to the same burst.

Regarding the above comment that an acknowledgement packet may not always be sent for every received data packet, but for every Nth packet, it may be noted that in the case of QUIC packets, specification currently states that a client device should generate and acknowledgment packet for every second packet it receives, i.e. N=2. However, there are also QUIC implementors experimenting with further reducing the frequency of transmission of acknowledgement packets, i.e. increasing N further. For example, there is currently a QUIC extension being drafted in IETF that allows two endpoints to negotiate a desired acknowledgement frequency. A client, e.g. data flow target node such as the client device 120 or communication device 220, that receives fewer packets than it requires before transmitting an acknowledgement, will wait until it has received the specified number of packets or until an acknowledgement timer expires. An on-path observer of acknowledgement packets that observes receipt of acknowledgement packets in e.g. the probe node 110 or the network node 211, would typically not be able to distinguish between a portion of latency contributed by network propagation and a portion of latency contributed by the wait for data packets until the acknowledgement packet is sent. To get better precision in latency estimates it is desirable to reduce the amount of time the client, e.g. data flow target node, will wait before transmitting an acknowledgement. If this is not known in advance, the data shaping node, e.g. the data shaping node 111 or network node 211, can detect for the acknowledgement frequency by gradually increasing the burst sizes and count the number of corresponding acknowledgments it observes per burst. When an acknowledgement frequency is known, e.g. by being obtained from a node with this information and/or by detection as just described, the data flow shaping node may thereafter set the burst sizes to be of an integer multiple of the acknowledgment frequency. For example, if the acknowledgement frequency is 10, then burst sizes of 10, 20, 30 etc. should be safe to use to avoid getting latency estimates skewed or interfered by acknowledgement timer latency, i.e. latency contribution caused by the wait for data packets until the acknowledgement packet is sent.

Embodiments herein may be most suitable for data traffic that is highly asymmetric, e.g., where the flow of data is primarily in the direction from a content server towards a client, which often is the case when data shaping nodes are applied to form bursts. However, in some situations, since e.g. QUIC does not expose "to the wire" whether a packet contains an acknowledgement, stream data or both, there is a risk that packets of other types could be taken for acknowledgement packets, or get misclassified as such, and thus disturb application of embodiment here and/or the result, e.g. making it difficult to identify a suitable burst interval and/or estimate latency with a desirable accuracy. However, in situations when acknowledgement packets can be identified as such and/or distinguished from other type of packets, this is of course not a problem. Also, in said case of asymmetric data traffic, presence of disturbing potential acknowledgement packets should anyhow not be at a problematic level.

That a packet is an acknowledgement packet as such can be assumed in some situations, e.g. in case of absence of other packets that could be acknowledgement packets. In some cases a packet can be identified as an acknowledgment packet based on some identifier or identifying features of the packet. For example may packet size be used. Also heuristics can be utilized based on expected behavior, e.g. following the application type or type of data relating to the data flow.

Figure 5:
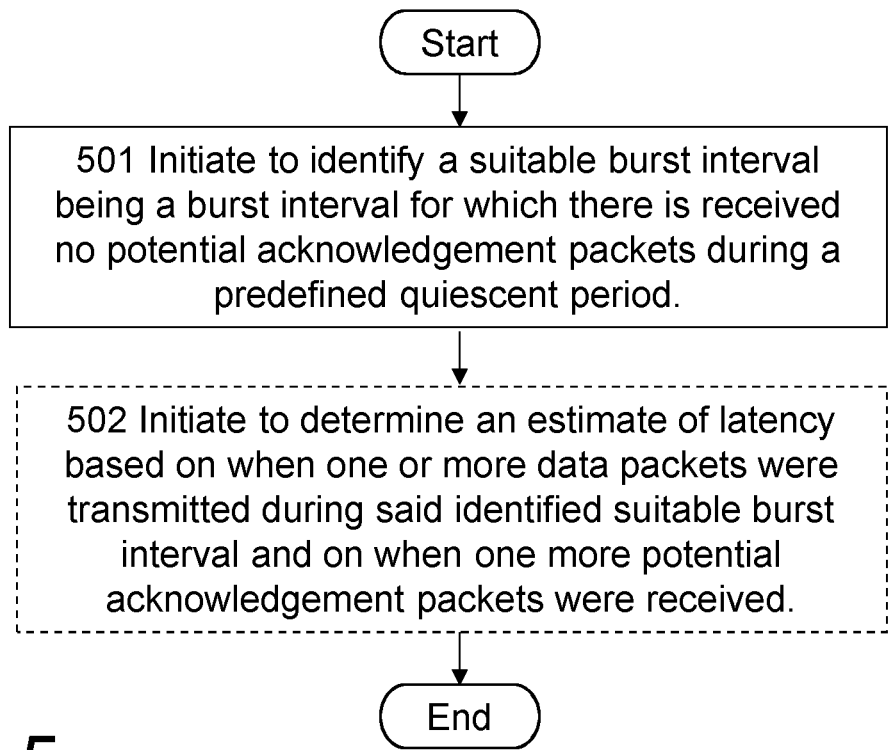
FIG. 5 is a flowchart schematically illustrating embodiments of a method according to embodiments herein.

FIG. 5 is a flowchart schematically illustrating embodiments of a method according to embodiments herein. The method is for supporting estimation of latency over a communication path, e.g. 160a-b; 260, in a communication network, e.g. 100; 200, between a data flow shaping node, e.g. 111; 211, and a probe node, e.g. 110; 211. The communication path, e.g. 160a-b; 260, comprises a data flow target node, e.g. 120; 220, configured to receive a data flow, e.g. 150; 250, from a data flow source node, e.g. 130; 230, via the communication path. The data flow shaping node, e.g. 111; 211, is configured to provide the data flow, e.g. 150; 250, in bursts towards the data flow target node, e.g. 120; 220. Each burst being transmitted during a respective burst interval, e.g. 410a-c, having a transmission period with data transmission and a subsequent silence period without data transmission. The method may be performed by one or more devices e.g. by the first communication system 10 or the second communication system 20, and/or the data flow shaping node 111 or the network node 211, and/or the remote device 141 and/or the remote computer network 140.

In some embodiments, the data flow shaping node, e.g. 111; 211, is further configured to, at least temporary during said suitable burst interval, e.g. 410b, if the data flow target node, e.g. 120; 220, requires an integer amount of received data packets order to send an acknowledgement packet, apply a burst data size that comprises at least said integer amount of data packets. The burst data size may comprise exactly said integer amount of data packets or an integer multiple of said integer amount of data packets.

Note that the actions below in may be taken in any suitable order and/or be carried out fully or partly overlapping in time when this is possible and suitable.

Action 501

The device(s) initiate to identify a suitable burst interval, e.g. 410b; 410c, being a burst interval for which the probe node, e.g. 110; 211, receives no potential acknowledgement packets during a predefined quiescent period, e.g. 411b; 411c, associated with, e.g. belonging to, the suitable burst interval, e.g. 410b; 410c, that covers an end portion of the suitable burst interval, e.g. 410b; 410c, and/or a begin portion of a subsequent burst interval, e.g. 410c. Said potential acknowledgement packets being acknowledgement packets that could have been transmitted by the data flow target node, e.g. 120; 220, to acknowledge receipt of data packets of the data flow, e.g. 150; 250. The data packets of the data flow may be QUIC packets.

As already mentioned above, the probe node may be the same as the data flow shaping node and the latency estimation may correspond to, or be based on, estimated RTT. Said suitable burst interval may be temporary applied and e.g. applied just for the purpose of supporting latency estimation according to embodiments herein. The identified suitable bust interval may e.g. be one of a sequence of different burst intervals applied to support of embodiment herein e.g. in order to result in at least one suitable burst interval. After the burst interval identified as suitable has been applied, the burst intervals thereafter may be as before or according to what else would be the case, i.e. without application of embodiments herein.

In some embodiments, the predefined quiescent period, e.g. 410*b*, extends such that it further covers also the begin portion of the subsequent burst interval, e.g. 410*c*.

The predefined quiescent period, e.g. 411*b*, may be predefined in relation to at least one burst interval, e.g. 410*b* and/or 410*c*, that it overlaps in time with. It may e.g. be predefined based on length of one or two burst intervals that the quiescent period overlaps with, and/or based on length of the transmission period and/or silence period of an overlapping burst interval. Typically it is predefined in relation to the burst interval the quiescent period is associated with, or in other word belongs to. The predefined quiescent period, e.g. 411*b*; 411*c*, may be predefined as a fraction of the suitable burst interval, e.g. 410*b*; 410*c*, and/or as a fraction of the subsequent burst interval, e.g. 410*c*. For example may the end portion be predefined as a percentage, e.g. 25%, of the suitable burst interval or a percentage of its silence period, and/or the begin period may be predefined as another or the same percentage, e.g. 25%, of the subsequent burst interval or a percentage of its transmission period.

In some embodiments, said suitable burst interval, e.g. 410*b*; 410*c*, is based on an predefined increase of a preceding burst interval, e.g. 410*a*, that resulted in that the probe node, e.g. 110; 211, received one or more potential acknowledgement packets during another predefined quiescent period, e.g. 411*a*, associated with said preceding burst interval, e.g. 410*a*. The preceding burst interval and/or the suitable burst interval may be burst interval(s) provided independent on application of embodiments herein, or may be provided to cause, or increase the probability for, a suitable burst interval, that would be identified in Action 501. In the latter case, and thus according to some embodiments, the burst intervals may change in a predefined manner after each application in order to increase said probability, e.g. by increasing the burst intervals. The predefined manner may be based on, e.g. with a predetermined relation to, burst intervals that else would be applied, e.g. without application of embodiments herein, and/or based on the preceding burst interval, e.g. that each burst interval being applied is predefined in relation to its preceding burst interval. Embodiments herein may be applied during a temporary time period when it is desirable to estimate latency and that may last until a sufficient burst interval is identified and the estimate of latency is determined, i.e. latency is estimated. Said burst intervals that change in a predefined manner may thus be applied as well during such temporary time period.

In some embodiments, said identification of the suitable burst interval is in further response to that the probe node, e.g. 110; 211, did not receive any potential acknowledgement packets during another predefined quiescent period, e.g. 411*b*, associated with a directly preceding burst interval, e.g. 410*b*, to the suitable burst interval, e.g. 410*c*. Said another quiescent period, e.g. 411*b*, covering an end portion of said preceding burst interval, e.g. 410*b*, and/or a begin portion of the suitable burst interval, e.g. 410*c*.

Action 502

The device(s) may further initiate to determine an estimate of the latency, i.e. estimate latency, based on when the data flow shaping node, e.g. 111; 211, transmitted one or more data packets during the identified suitable burst interval, e.g. 410*b*; 410*c*, and based on when the probe node, e.g. 110; 211, received one more potential acknowledgement packets, e.g. 412*b*-1 . . . 412*b*-4; 412*c*-1 . . . 412*c*-4, regarding said one or more data packets. The one or more potential acknowledgement packets thus being received before said quiescent period. When the probe node is the data flow shaping node, the latency can be considered to correspond to RTT.

The estimate may be determined based on first timing information, e.g. t1; t3, related to when the data flow shaping node, e.g. 111; 211, transmitted the first data packet of said one or more data packets and on second timing information, e.g. t2; t4, related to when the probe node, e.g. 110; 211, received the first potential acknowledgement packet, e.g. 412*b*-1; 412*c*-1.

When it has been identified that a burst interval is suitable, this means that the probe node has received no potential acknowledgement packets during a time period corresponding to the quiescent period(s) and thus likely, or even be certain in some situations, that the potential acknowledgement packets received by the probe node were sent to acknowledge, i.e. in response to, the data packets of the burst of the suitable burst interval. The data shaping node enables access to information when the burst data packets were sent, e.g. corresponding to t1 or t3. The time of receipt of potential acknowledgement packets by the probe node, e.g. the data shaping node itself, provide timing information, e.g. corresponding to t2 or t4, regarding receipt of the acknowledgement packets. The communication path is between the data shaping node and the probe node, and thus the latency, corresponding to RTT when the probe node is the data shaping node, can thereby be estimated, or in other words it can be determined an estimate of the latency.

Hence, embodiments herein support supporting estimation of latency that work also when data packets are QUIC packets without spin bit.

As used herein, device(s) that initiates to perform an action, e.g. to transmit, refers to any pre-action and/or sub-action that causes or makes the action to be performed. The initiation, i.e. pre-action and/or sub-action, may be performed by the device that performs the action itself or another entity. A device that change from not performing an action to actively performing an action itself will include some initiation to perform the action, or in other words, initiate to perform an action is included when a device itself performs the action being initiated. Initiation of an action performed by another entity than performing the action itself may correspond to some signal provided or action performed by the other entity, e.g. trigger signal, that causes the device to perform the action. As mentioned, in some embodiments the method, and/or some or all actions thereof, is/are e.g. performed by the data flow shaping node 111 or the network node 211, and/or the remote device 141 and/or the remote computer network 140, e.g. a computer cloud, and embodiment herein may then for example, at least partly, be initiated by or provided as a cloud service. In case the method and/or some or all actions thereof are performed by one or more nodes part of e.g. the communication network 100 or wireless communication network 200, e.g. the data flow shaping node 111 or the network node 211, the node(s) thereof performing respective action is typically also performing what is being initiated, e.g. the data flow shaping node 111 or the network node 211 may identify the suitable burst interval in action 501 and/or determine the estimate of the latency in Action 502.

Figure 6:
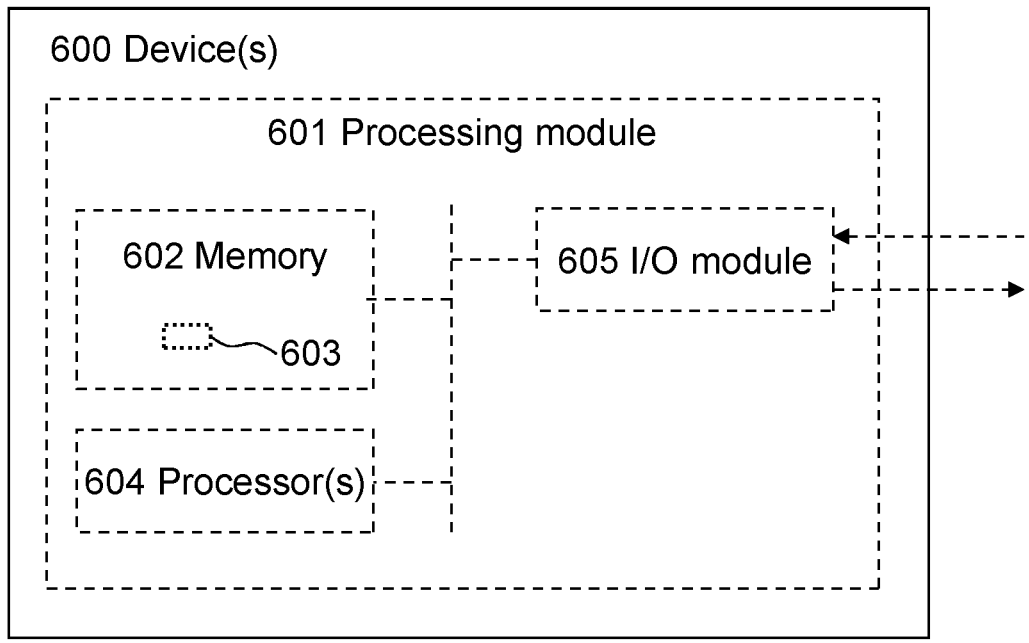
FIG. 6 is a schematic block diagram for illustrating embodiments of how one or more devices may be configured to perform the first method.

FIG. 6 is a schematic block diagram for illustrating embodiments of how one or more devices 600, e.g. said one or more devices discussed above in connection with FIG. 5, may be configured to perform the method and actions discussed above in connection with FIG. 5.

Hence, the device(s) 600 is for supporting estimation of latency over said communication path, e.g. 160a-b; 260, in the communication network, e.g. 100; 200, between the data flow shaping node, e.g. 111; 211, and the probe node, e.g. 110; 211. The communication path comprising the data flow target node, e.g. 120; 220, configured to receive the data flow, e.g. 150; 250, from the data flow source node, e.g. 130; 230, via the communication path. The data flow shaping node being configured to provide the data flow in bursts towards the data flow target node. Each burst being transmitted during a respective burst interval, e.g. 410a-c, having a transmission period with data transmission and a subsequent silence period without data transmission.

The device(s) 600 may comprise a processing module 601, such as a means, one or more hardware modules, including e.g. one or more processors, and/or one or more software modules for performing said method and/or actions.

The device(s) 600 may further comprise memory 602 that may comprise, such as contain or store, a computer program 603. The computer program 603 comprises 'instructions' or 'code' directly or indirectly executable by the device)(s) 600 to perform said method and/or actions. The memory 602 may comprise one or more memory units and may further be arranged to store data, such as configurations and/or applications involved in or for performing functions and actions of embodiments herein.

Moreover, the device(s) 600 may comprise a processor(s) 604, i.e. one or more processors, as exemplifying hardware module(s) and may comprise or correspond to one or more processing circuits. In some embodiments, the processing module(s) 601 may comprise, e.g. 'be embodied in the form of' or 'realized by' processor(s) 604. In these embodiments, the memory 602 may comprise the computer program 603 executable by the processor(s) 604, whereby the device(s) 600 is operative, or configured, to perform said method and/or actions thereof.

Typically the device(s) 600, e.g. the processing module(s) 601, comprises Input/Output (I/O) module(s) 605, configured to be involved in, e.g. by performing, any communication to and/or from other units and/or devices, such as sending and/or receiving information to and/or from other devices, e.g. receiving from the server device 130 and sending towards first client device 120. The I/O module(s) 605 may be exemplified by obtaining, e.g. receiving, module(s) and/or providing, e.g. sending, module(s), when applicable.

Further, in some embodiments, the device(s) 600, e.g. the processing module(s) 601, comprises one or more of an initiating module(s), identifying module(s), and determining module(s), as exemplifying hardware and/or software module(s) for carrying out actions of embodiments herein. These modules may be fully or partly implemented by the processor(s) 604.

Hence:

The device(s) 600, and/or the processing module(s) 601, and/or the processor(s) 604, and/or the I/O module(s) 605, and/or the initiating module(s), and/or the identifying module(s) may thus be operative, or configured, to identify said suitable burst interval, e.g. 410b; 410c.

The device(s) 600, and/or the processing module(s) 601, and/or the processor(s) 604, and/or the I/O module(s) 605, and/or the initiating module(s), and/or the determining module(s) may also be operative, or configured, to initiate to determine said estimate of the latency.

Figure 7:
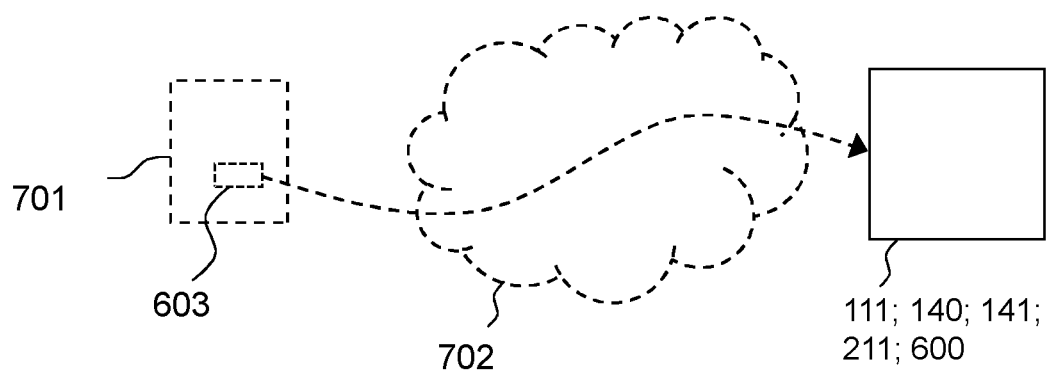
FIG. 7 is a schematic drawing illustrating some embodiments relating to computer program and carriers thereof to cause device(s) to perform said first method and related actions.

FIG. 7 is a schematic drawing illustrating some embodiments relating to computer program and carriers thereof to cause said device(s) 600 discussed above to perform said first method and related actions. The computer program may be the computer program 603 and comprises instructions that when executed by the processor(s) 604 and/or the processing module(s) 601, cause the device(s) 600 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 701 as schematically illustrated in the figure. The computer program 603 may thus be stored on the computer readable storage medium 701. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 801 may be used for storing data accessible over a computer network 702, e.g. the Internet or a Local Area Network (LAN). The computer program 603 may furthermore be provided as pure computer program(s) or comprised in a file or files. The file or files may be stored on the computer readable storage medium 701 and e.g. available through download e.g. over the computer network 702 as indicated in the figure, e.g. via a server. The server may e.g. be a web or File Transfer Protocol (FTP) server. The file or files may e.g. be executable files for direct or indirect download to and execution on said device(s) 600 to make it perform as described above, e.g. by execution by the processor(s) 604. The file or files may also or alternatively be for intermediate download and compilation involving the same or another processor(s) to make them executable before further download and execution causing said device(s) 600 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting.

Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by one or more devices, for supporting estimation of latency over a communication path in a communication network between a data flow shaping node and a probe node, which communication path comprises a data flow target node configured to receive a data flow from a data flow source node via the communication path, the data flow shaping node being configured to provide the data flow in bursts towards the data flow target node, each burst being transmitted during a respective burst interval having a transmission period with data transmission and a subsequent silence period without data transmission, wherein the method comprises:

initiating to identify a suitable burst interval being a burst interval for which the probe node receives no potential acknowledgement packets during a predefined quiescent period that is associated with the suitable burst interval and that covers an end portion of the suitable burst interval or a begin portion of a subsequent burst interval, said potential acknowledgement packets being acknowledgement packets that could have been transmitted by the data flow target node to acknowledge receipt of data packets of the data flow, wherein the predefined quiescent period is predefined in relation to at least the suitable burst interval or the subsequent burst interval that overlaps in time with the predefined quiescent period, wherein the predefined quiescent period comprises a predefined time period that overlaps both a portion of a silent period of a burst interval corresponding to a first burst and a portion of a transmission period of a subsequent burst interval corresponding to a second burst, wherein said predefined quiescent period is predefined as a fraction of said suitable burst interval or as a fraction of the subsequent burst interval.

2. The method as claimed in claim 1, wherein the method further comprises:
    initiating to determine an estimate of the latency based on when the data flow shaping node transmitted one or more data packets during the identified suitable burst interval and when the probe node received one more potential acknowledgement packets regarding said one or more data packets.

3. The method as claimed in claim 2, wherein the estimate is determined based on first timing information related to when the data flow shaping node transmitted the first data packet of said one or more data packets and on second timing information related to when the probe node received the first potential acknowledgement packet.

4. The method as claimed in claim 1, wherein said suitable burst interval is based on a predefined increase of a preceding burst interval that resulted in that the probe node received one or more potential acknowledgement packets during a predefined quiescent period associated with said preceding burst interval.

5. The method as claimed in claim 1, wherein said identification of the suitable burst interval is further in response to that the probe node did not receive any potential acknowledgement packets during another predefined quiescent period associated with a directly preceding burst interval to the suitable burst interval, said another quiescent period covering an end portion of said preceding burst interval or a begin portion of the suitable burst interval.

6. The method as claimed in claim 1, wherein the data packets of the data flow are QUIC packets.

7. A device comprising one or more devices for supporting estimation of latency over a communication path in a communication network between a data flow shaping node and a probe node, which communication path comprises a data flow target node configured to receive a data flow from a data flow source node via the communication path, the data flow shaping node being configured to provide the data flow in bursts towards the data flow target node, each burst being transmitted during a respective burst interval having a transmission period with data transmission and a subsequent silence period without data transmission, wherein said device is configured to:
    initiate to identify a suitable burst interval being a burst interval for which the probe node receives no potential acknowledgement packets during a predefined quiescent period that is associated with the suitable burst interval and that covers an end portion of the suitable burst interval or a begin portion of a subsequent burst interval, said potential acknowledgement packets being acknowledgement packets that could have been transmitted by the data flow target node to acknowledge receipt of data packets of the data flow, wherein the predefined quiescent period is predefined in relation to at least the suitable burst interval or the subsequent burst interval that overlaps in time with the predefined quiescent period, wherein the predefined quiescent period comprises a predefined time period that overlaps both a portion of a silent period of a burst interval corresponding to a first burst and a portion of a transmission period of a subsequent burst interval corresponding to a second burst, wherein said predefined quiescent period is predefined as a fraction of said suitable burst interval or as a fraction of the subsequent burst interval.

8. The device as claimed in claim 7, wherein the device is further configured to:
    initiate to determine an estimate of the latency based on when the data flow shaping node transmitted one or more data packets during the identified suitable burst interval and when the probe node received one more potential acknowledgement packets regarding said one or more data packets.

9. The device as claimed in claim 8, wherein the estimate is determined based on first timing information related to when the data flow shaping node transmitted the first data packet of said one or more data packets and on second timing information related to when the probe node received the first potential acknowledgement packet.

10. The device as claimed in claim 7, wherein said suitable burst interval is based on a predefined increase of a preceding burst interval that resulted in that the probe node received one or more potential acknowledgement packets during another predefined quiescent period associated with said preceding burst interval.

11. The device as claimed in claim 7, wherein said identification of the suitable burst interval is further in response to that the probe node did not receive any potential acknowledgement packets during another predefined quiescent period associated with a directly preceding burst interval to the suitable burst interval, said another quiescent period covering an end portion of said preceding burst interval or a begin portion of the suitable burst interval.

12. The device as claimed in claim 7, wherein the data packets of the data flow are QUIC packets.

* * * * *